INVENTOR.
Frank T. Powers.

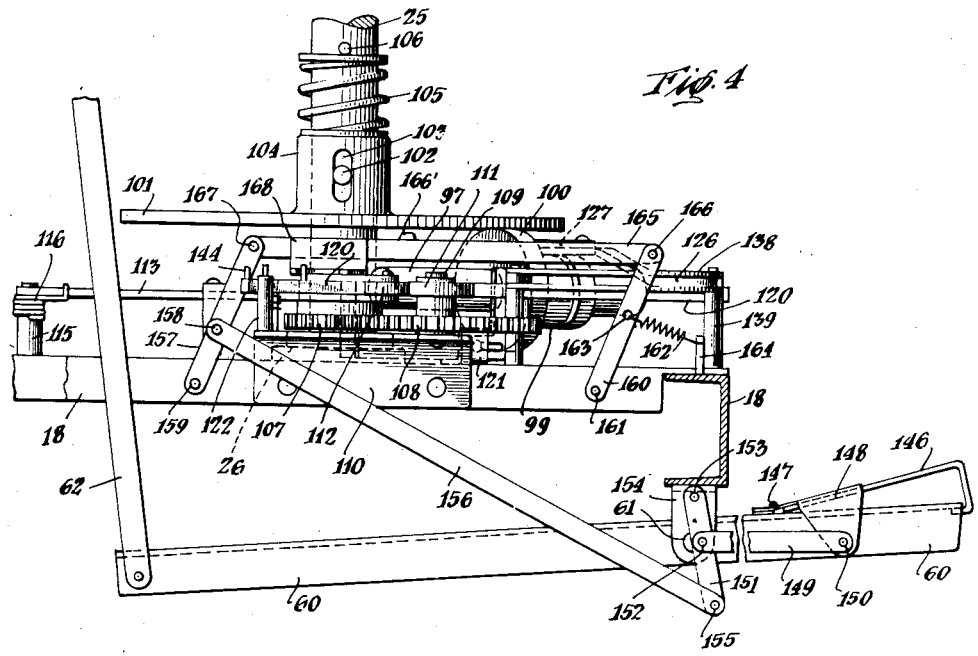
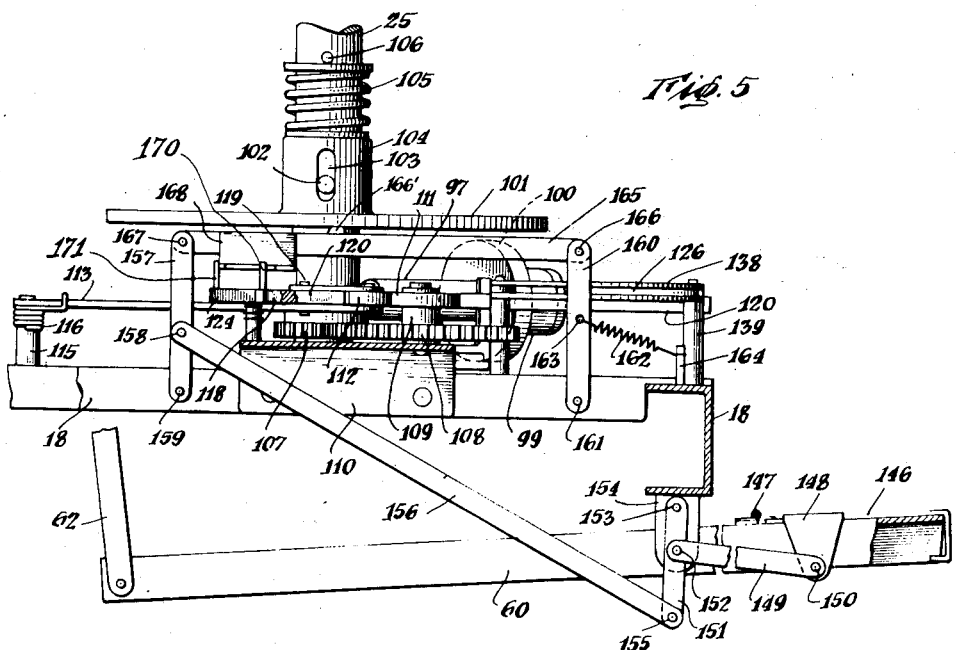

Patented Oct. 23, 1945

2,387,349

UNITED STATES PATENT OFFICE 2,387,349

APPARATUS FOR PREPARING PHOTOENGRAVING PLATES

Frank T. Powers, Glen Cove, N. Y.

Application September 17, 1943, Serial No. 502,739

9 Claims. (Cl. 91—42)

This invention relates to an apparatus for evenly distributing and drying a wet coating on the surface of a flat plate such as the sensitive coating on photo-engraving plates.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 4 is a detailed view of the rotating mechanism of the apparatus in position to whirl the plate; and Fig. 5 is a detailed view similar to Fig. 4 but showing the rotating mechanism of the apparatus in inoperative driving position.

Figure 1:
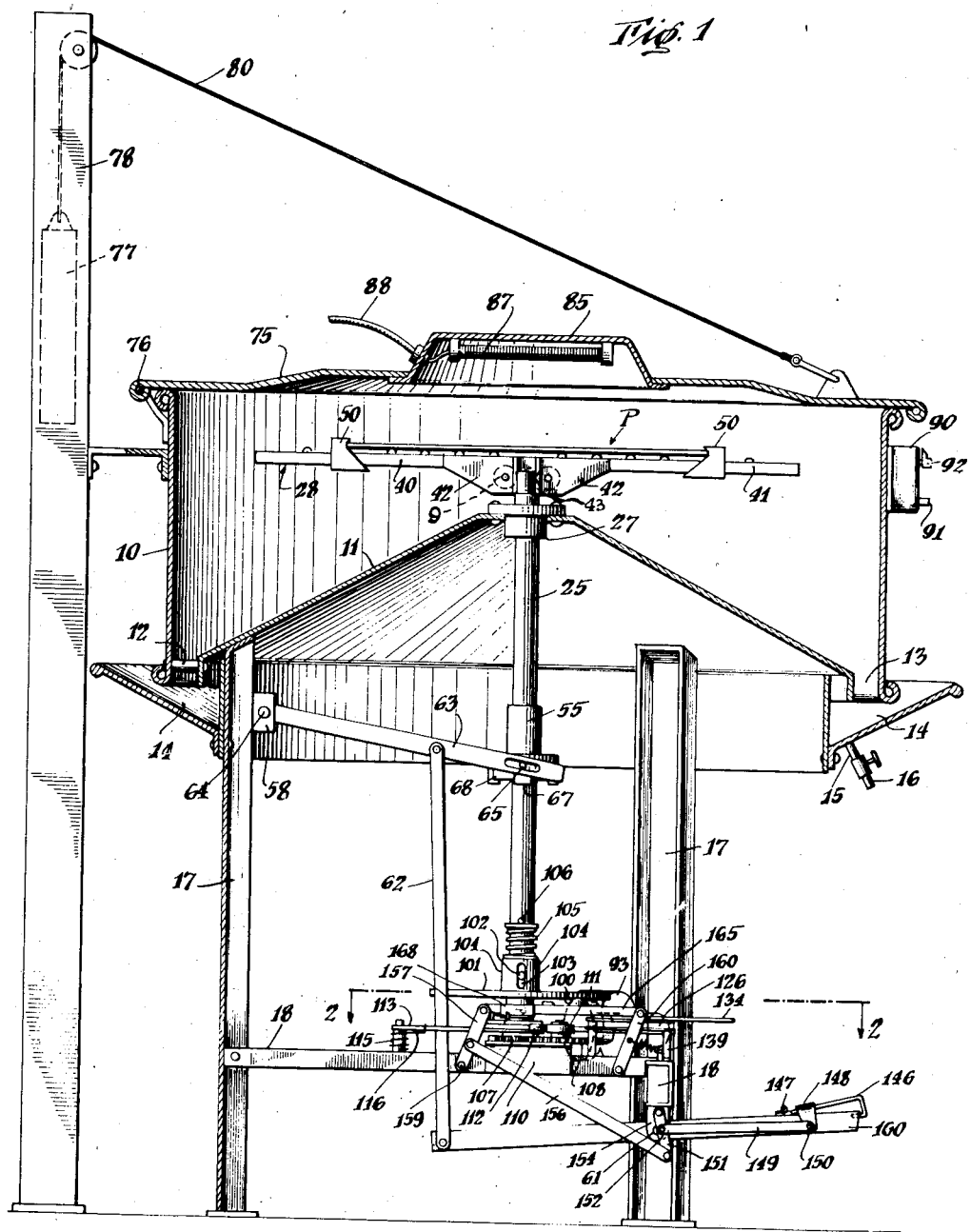
Fig. 1 is a vertical central section through the apparatus, with certain parts in elevation and showing a plate in position to be rotated.

One object of the invention is to provide a device for holding a plate in a horizontal plane and whirling it to distribute evenly a coating fluid placed thereon and cast off the excess material. Another object is to provide convenient means to control the time and speed of whirling of the plates, whereby plates of different characteristics or coating solutions of different compositions may be whirled at the right speed and for the desired length of time. A further object of the invention is to provide completely automatic speed varying means for whirling the plates, with a variability of starting speed, an infinitely variable increase of speed of whirling and a variability of final speed. The invention has for a further object the provision of a manual control of speed which may be substituted, by the operative for a completely automatic system of speed increase or be used together therewith as determined by the operator.

Other objects and conveniences of operation will appear to those skilled in the art upon study of the following description and accompanying drawings.

In my co-pending application Serial No. 425,547, filed on January 3, 1942, I have disclosed, illustrated, and claimed a whirler device for a plate to be coated of novel form and the present invention comprises an improvement of my prior invention and has certain features in common therewith. Accordingly, the illustrated embodiment of the present invention shows certain parts of the illustrated embodiment of my stated co-pending application and reference should be made to said co-pending application for clarification of description of mechanism common to this invention and the invention of my co-pending application.

Referring now to the drawings there is provided a cylindrical shell 10, which may have rolled top and bottom edges for strengthening it, preserving its shape and contributing to its appearance. A conical bottom plate 11 is secured in spaced relation to the lower edge of shell 10 by spacer bolts 12 so as to provide a channel 13 through which excess sensitizing solution may drain out of the shell into a collecting gutter 14 from which it may be drawn from time to time through the exit pipe 15 and valve 16.

For supporting the shell 10 and associated parts at a convenient height there may be provided three channel shaped legs 17 secured to the underside of the conical bottom plate 11 near the outer edge thereof and braced near the bottom by a frame member 18 suitably secured to all the legs. The legs 17, further, form the means of support for the gutter 14.

For whirling the plates there is provided a vertical shaft 25, journaled at the bottom in a bearing 26 (Fig. 4) carried on the frame member 18 and near the top in a bearing 27 secured at the center of the conical bottom plate 11. A horizontally disposed rack 28, secured to the top of the shaft 25 so as to rotate therewith is adapted to securely hold in a substantially centralized position a photo-engraving plate P to be processed.

Referring now to the means for holding and centralizing photo-engraving plate P upon the rack 28, a form of rack may be provided consisting of crossed, horizontally disposed arms 40, 41 secured together at their centers and to the top of shaft 25 by gusset plates 42 as by spot welding or otherwise. Both sets of arms 40, 41 may be identical in cross section and as shown are rectangular channel bars having inturned ledges 43 along their side flanges.

To centralize the plate P upon rack 28 and retain it there during the whirling operation a pair of interconnected notched clips 50 are provided, which are slidably mounted on arms 40 on opposite sides of the central mounting of the arm on shaft 25.

As disclosed in my co-pending application hereinbefore referred to, the two clips 50 are interconnected through a common actuating means for simultaneous and equal but opposite movement whereby they may be spread apart along arm 40 by pedal means for insertion of plate P upon rack 28 and upon release of the pedal may be spring-drawn together in equal amounts to centralize and hold the plate in processing position.

The clips 50 are actuated by pedal means through lever and link connections whereby when the pedal is depressed the clips 50 move apart equidistant from the center of rack 28 and upon release of the pedal, clips 50 are spring-drawn towards the center in equal amounts to grip and center the plate P upon the rack. As embodied a pedal 60, pivoted at 61 to frame member 18, is connected by a link 62 to a lever 63 which is pivoted at 64 on a bracket 58 secured to the rearmost leg 17. The forward end of lever 63 is pivotally attached to a sleeve 55 slidable on shaft 25 by pin and slot connections 65, the pins of which are carried by plates 67 fixed upon opposite slides of a ball thrust bearing housing 68, the bearing unit of which is mounted upon the lower end of sleeve 55. Thus, rotation of sleeve 55 is permitted while pins 65 and housing 68 are held non-rotative by lever 63, and as lever 63 is actuated, sleeve 55 and clips 50 are moved to their various positions by a suitable cable (not shown) over the wheels 9, connecting sleeve 55 with clips 50.

Means are provided for closing the top of shell 10 and for heating and drying the coating fluid upon plate P by direct radiant heat instead of a heated atmosphere and/or heat supplied beneath the plate and conducted through it to the solution to be dried. The circular cover 75 being hinged at 76 to the rear portion of shell 10 and counterweighted for ease of opening and closing by a weight 77 carried within a vertical, hollow post 78 attached to the back of the apparatus. Weight 77 is attached to cover 75 by a cable 80 running over a pulley pivoted in post 78 and secured to cover 75.

Secured to an opening in the central portion of cover 75 is a heating unit consisting of a rectangular inverted pan 85, the inner surface of which may be formed as a heat reflecting surface and upon which are mounted by means of insulated blocks a plurality of electrical heat coils 87 the common cable 88 of which passes out of the pan 85 to its interconnection with timing circuits as will be hereinafter described. Conveniently placed at the front of the apparatus within easy reach of the operator is a control unit consisting of a starting and time limiting switch box 90, having a starting button 91 and time setting dial 92.

In accordance with the present invention friction drive means are provided for rotating the plate holder in the manner desired. As embodied, as a constant speed mover an electric motor 93 is mounted upon frame member 18 and is adapted to drive said shaft 25 through an infinitely or minutely variable drive. A reduction gear 94 is mounted on the drive shaft of the motor 93 and conveniently is carried by the motor casing of motor 93. The driven shaft 95 has mounted thereon a splined shaft 97, said shaft 97 being suitably attached to said shaft 95 as by a coupling end 96 and set screws 98 therethrough.

Mounted to slide on the feather of said shaft 97 is a collar 99 to which is attached by suitable means a friction driving wheel 100. Friction driving wheel 100 is adapted to cooperate with a driven disc 101 mounted upon shaft 25 so as to drive shaft 25 when desired, as will be hereinafter described.

To accomplish this, disc 101 is mounted near the lower end of shaft 25 to slide thereon, movements being limited by a pin 102 attached to shaft 25 acting within a slot 103 in a hub portion 104 of disc 101. A spring 105 is arranged between disc 101 and a pin 106 on the shaft 25, spring 105 riding on the edge of hub 104 and serving to press disc 101 resiliently downward against driving wheel 100 to ensure good driving contact.

It is a feature of this invention to provide means whereby said friction disc 101 and thus shaft 25 and plate P, is driven in a predetermined cycle of speed increase. As embodied, such means include pawl and ratchet means to automatically advance friction driving wheel 100 radially of disc 101 to vary the driving ratio. To this end, there is mounted on the end of shaft 25, which extends below disc 101, a driving pinion 107 which meshes with a spur gear 108 mounted on a shaft 109. Shaft 109 is suitably rotatably carried by an angle bracket 110 attached to frame member 18. At the upper end of shaft 109 an eccentric cam 111 is attached adapted to move with the shaft 109 and spur gear 108 under influence of rotation of shaft 25.

A cam follower 112 rides upon the periphery of cam 111. Cam follower 112 is preferably of circular cross section and is pivotally mounted on an arm 113 by a bearing or the like 114, to reduce wear of the cam surface during its rotation. Arm 113 is pivotally carried by a member 18, being pivoted to a standard 115 mounted thereon. A spring 116 is arranged between standard 115 and arm 113 to constantly urge cam follower 112 into contact with eccentric cam 111. A guide and limiting plate 117 attached to a part of frame 18 spans arm 113 leaving sufficient clearance on either side of arm 113 to permit floating of said arm under influence of movements of cam follower 112.

Carried by said arm 113 and adapted to move therewith is a pawl 118 pivoted at 119. Pawl 118 is a driving pawl and acts upon a rack 120 having a plurality of suitable shaped teeth to advance rack 120 forward step by step, one tooth span being advanced for every complete revolution of cam 111. Rack 120 is slidably supported on frame 18 by an angle bracket 121 and a pin 122 carried by the angle bracket 110. Another pin 123 mounted on frame 18 also assists the guiding.

Pawl 118 is preferably spring urged into contact with the teeth of rack 120 as by a spring surrounding pivot 119. Bracket 110 also has mounted thereon a retainer 124 in the form of another pawl pivoted at 125 and also spring urged toward the teeth of rack 120 by a spring surrounding its pivot 125. Both of pawls 118 and 124 are so shaped that they permit movement of rack 120 in one direction only and the function of pawl 124 is to retain rack 120 in its advanced position while pawl 118 is moved out of contact with the teeth of rack 120 due to movements of its carrying arm 113.

According to this invention, means are provided whereby movements of the rack 120 forward are adapted to slide friction drive wheel 100 inwardly on its feathered shaft 97 and relative to driven disc 101 to increase the speed of shaft 25 driven by said disc 101. As embodied, rack 120 is adapted to carry with it during its forward periodic movements a lever 126 pivoted at 127 to a part of frame 18. Intermediate of its length lever 126 carries a link 127 connected pivotally as at 130, link 127 being pivotally attached to collar 99 of driving wheel 100.

Figure 2:
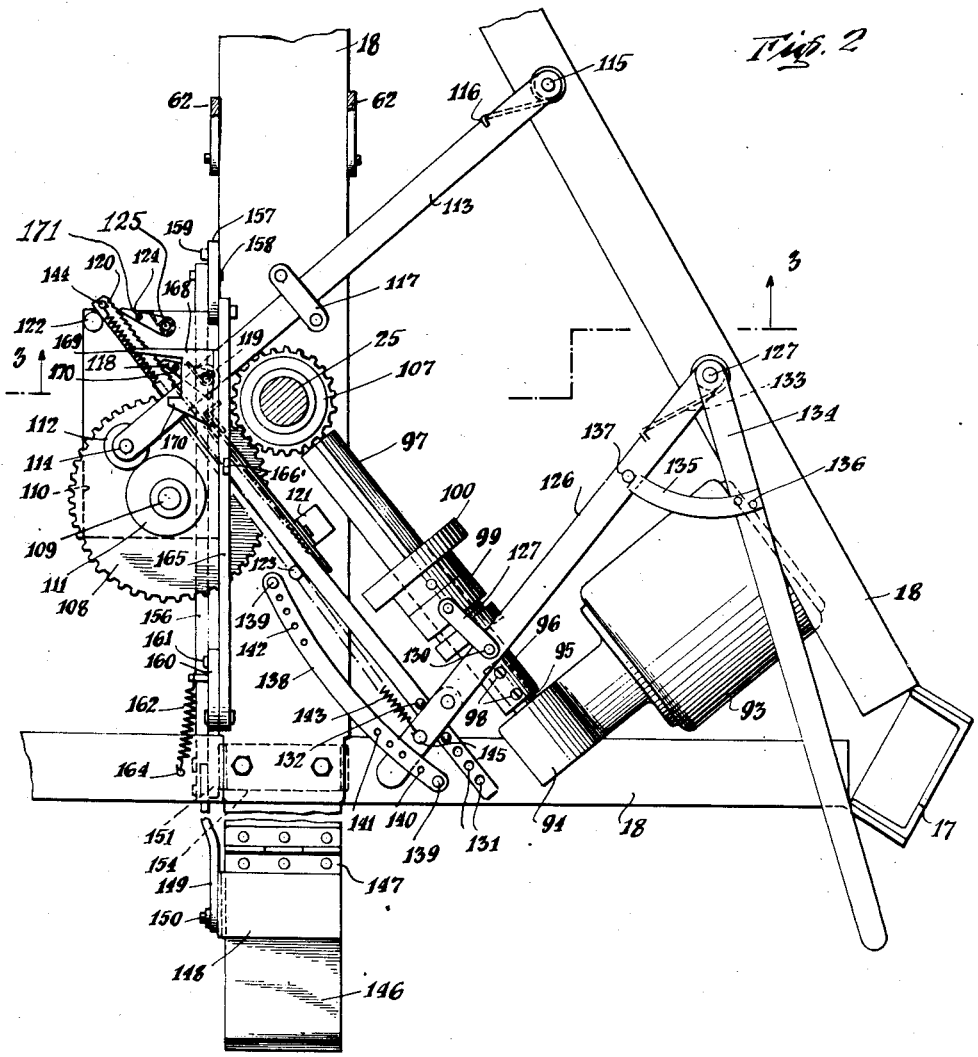
Fig. 2 is a section on the lines 2—2 of Fig. 1 and showing the operating parts of the rotating mechanism.
Figure 3:
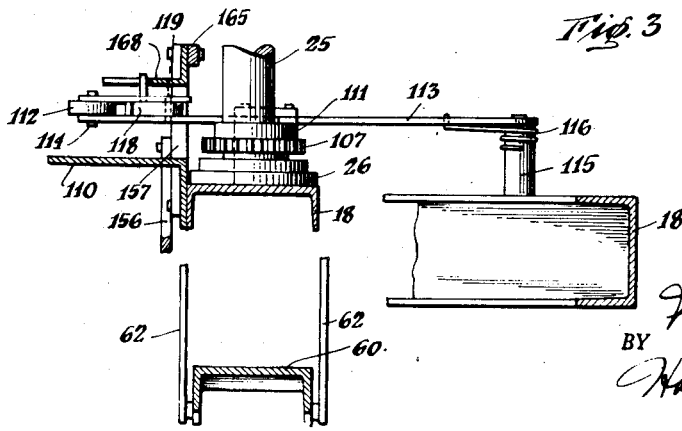
Fig. 3 is a section on lines 3—3 of Fig. 2.

The end of rack 120 coacting with lever 126 is perforated with a plurality of holes 131 and a pin 132 is adapted to be placed selectively in any of said holes. Pin 132 forms the driver member for pushing lever 126 around its pivot 127, as will clearly be seen from Fig. 2, and the several holes 131 make it possible to vary and predetermine the initial starting speed of the shaft 25 through disc 101 and driving wheel 100. If pin 132 is in the foremost hole, as shown in Fig. 2, then the highest starting speed will be attained whereas if the pin 132 is placed in the last or rearmost hole, lever 126 will move rearwardly under a spring 133 arranged around pivot 127 moving driving wheel 100 rearwards as viewed in Fig. 2 and thus resulting in the slowest drive between driving wheel 100 and disc 101. Thus, by selectively arranging holes 131 in the end of rack 120 it is possible to attain a desired variability of initial speeds for various uses of the apparatus, as a whole.

Furthermore, a manual control of the speed of shaft 25 is sometimes of advantage and the present invention envisages this. As embodied, a manual control lever 134 is provided, pivoted on the same pivot 127 as lever 126. A quadrant 135 is attached to lever 134, as at 136. A part of quadrant 135 is adapted to contact a pin 137 mounted upon lever 126 as shown in Fig. 2. It will be seen that manual movements of lever 134 will cause movements forwardly of disc 100 on its shaft 97 to increase the speed of shaft 25 while in the same way, speed can be manually reduced by reversing the movement of lever 126.

In using the manual lever 134, the rack 120 will continue to function under influence of pawl 118 while pin 132 is in position to be contacted by lever 126, but if pin 132 is removed entirely, manual control can be obtained without any automatic control, the rack 120 then running idly over pawls 118 and 124 under influence of cam 111, thus giving complete manual control or automatic control, or both of these, of the speed of rotation of shaft 25 and plate P carried thereby.

If desired, a limiting guard may be provided for use with extra automatic or manual control. As embodied, a curved guard 138 is attached to portions of frame 18, as shown, the end of lever 126 passing thereunder. At each end of the guard stop members 139 are provided thus limiting the overall swing of lever 126 around pivot 127, the limits being predetermined to suit desired conditions of working. Variability of lower limits may be provided comprising a plurality of holes 141 in said guard into which a pin 140 is placed, thus permitting a varied limit of lowest speed. In the same manner, upper limits can be predetermined and varied by holes 142 into which a pin can be placed to prevent speeds higher than that desired being reached. Obviously, the variable limits of guard 138 operate for either manual or automatic control, or both.

To constantly urge lever 126 forward and cause good contact between lever 126 and pin 132 a spring 143 is arranged between a peg 144 on the forward end of rack 120 and a peg 145 on lever 126. This spring also serves to make good contact between the teeth of rack 120 and pawls 118 and 124.

According to this invention, it is further provided to permit of disengaging the driving means from operative contact with shaft 25, for example, when it is desired to change a plate P, thereby rendering it unnecessary to stop motor 93. As embodied, a foot lever is arranged to disassociate driving wheel 100 from friction disc 101, this lever also serving to release the plate holding means and also return the rack and pawl mechanism to the starting position, for the next run.

In my before-mentioned co-pending application I have shown a foot operated lever 60 attached to arm 62 which is adapted to unclutch the plate P when lever 60 is depressed. In the instant invention, foot lever 60 carries out this function in the same manner, and is modified, to permit the additional functions hereinafter mentioned to be carried out.

As embodied, foot lever 60 has mounted on the end thereof a pedal 146 hinged to lever 60 at 147. A depending bracket 148 is attached to pedal 146 and carries at its lower end a link 149 pivoted at 150. Link 149 is pivoted to a lever bar 151 intermediate its length at 152. Lever bar 151 is pivoted at its extremities, at one end by pivot 153 to a depending lug 154 attached to frame 18, and at the other end by pivot 155 to an operating bar 156. Bar 156 is pivoted to a link 157 intermediate its ends at 158, the lower end of said bar being pivoted to frame 18 at 159. A link 160 of equal length to link 157 is also pivoted on the same member of frame 18 at 161, and has a spring 162 attached at 63 to an intermediate part of the lever. The other end of spring 162 is attached to a post 164 on frame 18. The upper ends of links 157 and 160 are connected together by an operating bar 165, pivoted at 167 to link 157 and 166 to link 160.

The connection of links 157 and 160, with the bar 165, and their lower connections to frame 18 at 159 and 161 are such that at all times links 157 and 160 are parallel. Pressure downward on pedal 146 will cause link 149 to move bar 151 and lever 156 to move links 157 and 160 to position shown in Fig. 5, while relaxing pressure on pedal 146 results in the link mechanism assuming the position shown in Fig. 4, where it will be noted bar 165 is in a lower position relative to disc 101 thereabove. Spring 162 causes the position of Fig. 4 with pedal up, or out of contact with bar 60 to normally pertain, until the operative decides to depress pedal 146 against spring 162.

Lever bar 165 has a plurality of lifting lugs 166' thereon adapted to contact the underside of disc 101 when in the position of Fig. 5 and thus lift said disc against its spring 105 out of contact with driving wheel 100, whereby motor 93 can be left running, if desired, while a new plate is placed in position for treatment. Depression of pedal 146 will disconnect at all times the driving means from shaft 25 giving the operative full control. Upon further foot pressure, lever bar 60 is depressed also to release the plate P as indicated hereinbefore.

It is also desired to be in a position to disconnect the pawls 118 and 124 from the teeth of rack 120 simultaneously with the depression of foot pedal 146 and to this end there is a release plate 168 having two portions 169 and 170 adapted to be placed into contact with extending pins 170 and 171 on pawls 124 and 118 respectively, to swing them around their pivots against their springs and release them from contact with the teeth of rack 120, permitting said rack to move backwards under urge of its spring 143 until it is stopped by the rearmost part of guard 138. In Figures 4 and 5 the relative positions of plate 168 is shown and in contact in Figure 5 with pins 170 and 171.

Plate 168 is carried by lever bar 165 and is bodily moved thereby to contact the extending pins on the two pawls when foot pedal 146 is depressed to stop rotation of shaft 25 and force the pawls out of operative engagement.

The method of operating the apparatus may be briefly as follows: The operator approaches the apparatus with a photoengraving plate in his hands, the plate having previously been coated with coating fluid, if desired. The cover 75 being open and the machine at rest the operator depresses pedal 146 and bar 60 thereby spreading apart the clips 50, and simultaneously bringing rack 120 back to starting position. The plate P is then placed upon the rack 28, being centered on the cross arm 41 by judgment of the operator. The pedal 146 and bar 60 are then released. Under influence of a suitable spring the notched clips 50 move together, grip and centralize the plate P on arm 40. The plate P is then ready to be whirled and dried as soon as the cover 75 is drawn down over the shell 10. A coating fluid may now be poured onto the center portion of the upper face of plate P, if the same has not been previously coated, and the cover lowered into place.

If time switch 90 is to be used, for automatic timing, the time setting control 92 is set at the point suitable to the article being processed, the starter button 91 is pressed and the plate P starts whirling, being brought gradually up to speed by means of the friction drive arrangement of driving wheel 100 and disc 101, and rack 120. As the motor starts whirling the plate P, excess coating liquid is driven off centrifugally and the remainder evenly distributed over the surface of the plate P.

The heating coils 87 having become radiant hot during the initial whirling of the plate P the continued whirling time is consumed in drying the solution remaining on the plate.

The time switch 90 then automatically opens the circuit, stopping the motor 34, allowing the coils 87 to cool off, and the plate to come to rest. The cover 75 is then raised by the operator and pedal 60 depressed, releasing the plate P from clips 50 to permit its removal. As desired, the adjustments of pins 132 and 141 in their respective guage holes will be made to limit the speed of the driven shaft 25 and plate P to suit the circumstances, these being made prior to whirling of the plate at a suitable stage in the procedure.

It will be observed that electric motor 93, which is the embodied form of prime mover, is operated at a constant speed, no variability of its speed being necessary or desired, whereby a more efficient system is provided, and economy of operation ensured.

The invention in its broader aspects is not limited to the specific mechanisms shown and described but departures may be made therefrom within the scope of the accompanying claims without departing from the principles of the invention and without sacrificing its chief advantages.

What I claim is:

1. A plate whirler for photoengraving use including in combination a rotatable plate support for evenly distributing a fluid coating on a plate, a heating element above said plate, and means for rotating said support and plate in a predetermined automatic speed increase cycle, said means including a friction drive assembly adapted to produce a minutely variable speed increase and means actuated from said driving means for effecting such increase with said last means.

2. In an apparatus for preparing photoengraving plates, the combination with a rotatable plate supporting means, radiant heating means above said supporting means and timing means automatically governing the length of time of rotation of said supporting means and of the application of heat from said heaters, of driving means for rotating said supporting means from a prime mover including a friction driving wheel driven by said prime mover, a friction disc driven by said driving wheel and in turn rotating said supporting means, and means actuated by said supporting means for automatically changing the relative positions of said friction driving wheel and driven disc to automatically vary the speed ratio between the prime mover and rotating supporting means.

3. A plate whirler for photoengraving use including in combination a rotatable plate support for evenly distributing a fluid coating over a plate held thereon, means for rotating said support from a predetermined variable minimum speed progressively up to a predetermined maximum and means for changing said speed under control of said rotating means.

4. Apparatus for whirling a photoengraving plate including in combination a rotatable plate support, a friction disc mounted to rotate said support, a friction driving wheel driving said friction disc, a prime mover driving said driving wheel and means operated by rotation of said support to impart a continuous step-by-step advancement of said driving wheel relative to said disc, to increase the speed of rotation of said support.

5. A plate whirler for photoengraving use including in combination a rotatable support for a plate, a friction driven disc for rotating said plate, a friction driving wheel for driving said disc when in contact therewith, a prime mover for driving said friction driving wheel, automatic means operated by rotation of said support to cause a cycle of progressive increments of speed increase of said support by moving said friction wheel and disc relative to each other, and release means simultaneously acting to disconnect contact of said friction wheel and disc and render said automatic means inoperative, whereby rotation of said support is stopped and said automatic means can be returned to a position for subsequent cyclic action.

6. A plate whirler for photoengraving use including in combination a rotatable plate support, a prime mover, friction drive mechanism between said prime mover and said support, said mechanism including a driven part and a driving part, means for moving said driving part relative to said driven part to change the transmission ratio of said friction drive mechanism and a cam and follower mechanism operated by the rotation of said support to supply increments of movements to said means.

7. A plate whirler for photoengraving use including in combination a rotatable plate support, a friction driven disc attached thereto, a friction driving wheel adapted to drive said disc, a prime mover driving said friction driving wheel, a splined shaft upon which said friction driving wheel is free to slide relative to said disc, to vary the driving speed of said disc, an operating bar for moving said wheel, said bar having teeth at one end, a cam adapted to rotate with said support, a cam follower associated with said cam and having a pawl thereon adapted to cooperate with the teeth on said bar to cause it to move said wheel with increments of speed increase, and limit stops adapted to be placed in predetermined variable positions to set the upper and lower speeds of rotation of said disc.

8. A plate whirler for photoengraving use including in combination a rotatable plate support for evenly distributing a fluid coating on a plate, and means for rotating said support comprising a prime mover, a friction wheel driven by said prime mover, a friction disc drivingly connected to the plate support and in contact with said friction wheel to be driven thereby, means to radially slide said friction wheel with respect to said friction disc while still in contact one with the other, and means operated by said rotatable support when rotated by said friction disc to progressively move said friction wheel step-by-step radially relative to said friction disc, to cause increments of rotational speed increase of said friction disc and said support, progressively.

9. A plate whirler for photoengraving use including in combination a rotatable support for a plate, a prime mover, a friction wheel driven by said prime mover, a friction disc driven by said wheel and drivingly connected to said plate support, automatic means for advancing said wheel radially relative to said disc, to change their driving ratio, and alternative manually operated means for advancing said wheel radially relative to said disc.

FRANK T. POWERS.